E. SCHNEIDER.
RECOIL BRAKE FOR GUNS.
APPLICATION FILED JUNE 16, 1919.

1,373,102.

Patented Mar. 29, 1921.
13 SHEETS—SHEET 1.

E. SCHNEIDER.
RECOIL BRAKE FOR GUNS.
APPLICATION FILED JUNE 16, 1919.
1,373,102.
Patented Mar. 29, 1921.
13 SHEETS—SHEET 2.
Fig. 1.ᵃ
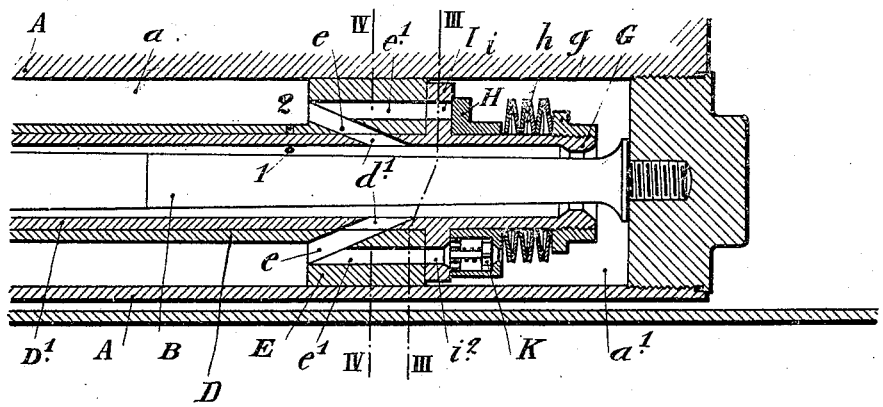
Fig. 2.
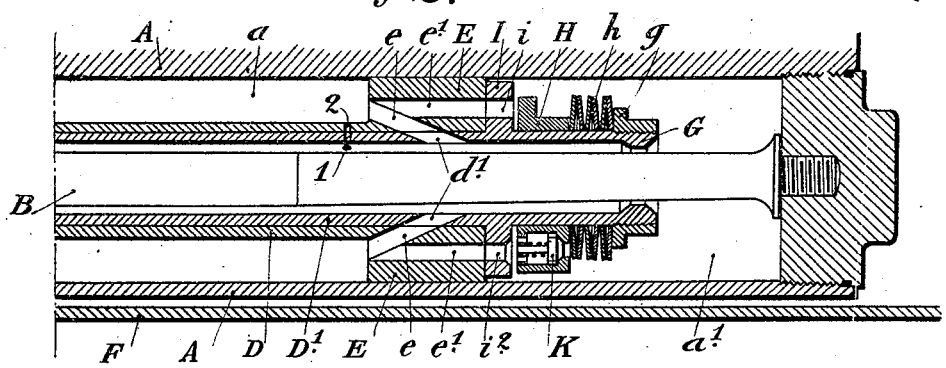
Fig. 5.
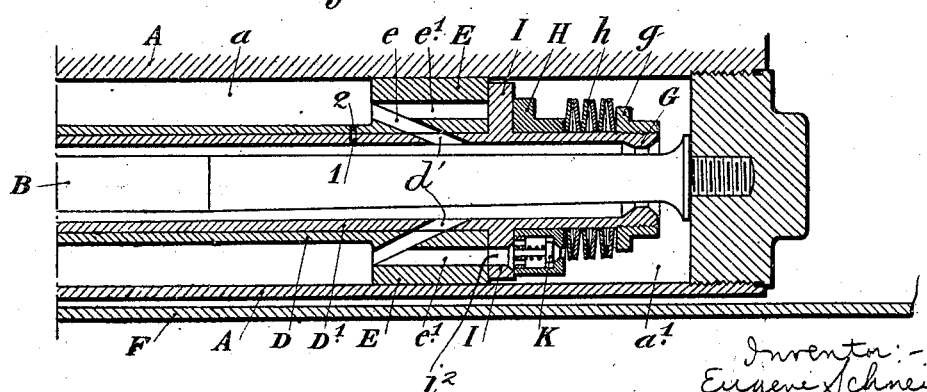

E. SCHNEIDER.
RECOIL BRAKE FOR GUNS.
APPLICATION FILED JUNE 16, 1919.

1,373,102.

Patented Mar. 29, 1921.
13 SHEETS—SHEET 3.

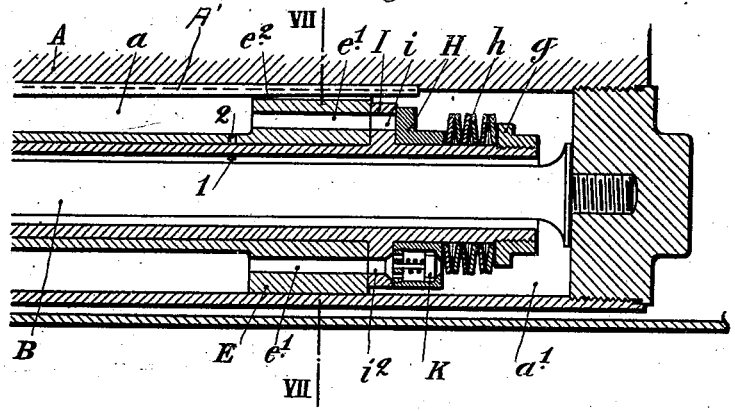
Fig. 6.ª
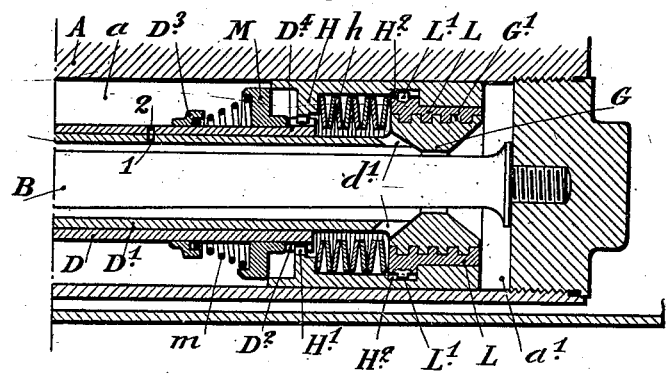
Fig. 11.
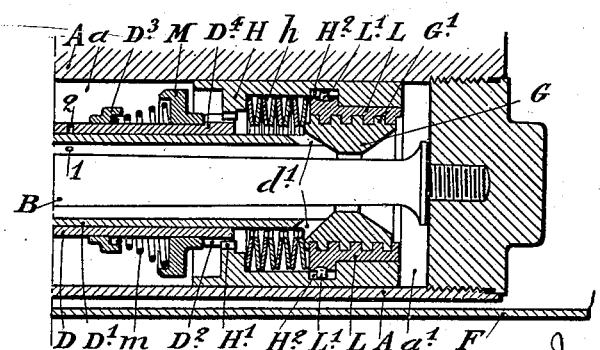
Fig. 13.

E. SCHNEIDER.
RECOIL BRAKE FOR GUNS.
APPLICATION FILED JUNE 16, 1919.
1,373,102.
Patented Mar. 29, 1921.
13 SHEETS—SHEET 5.
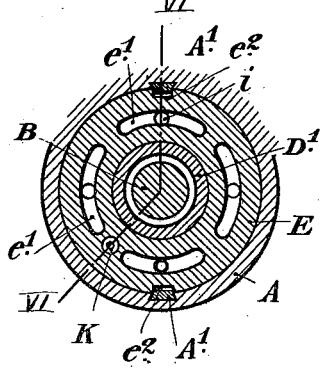
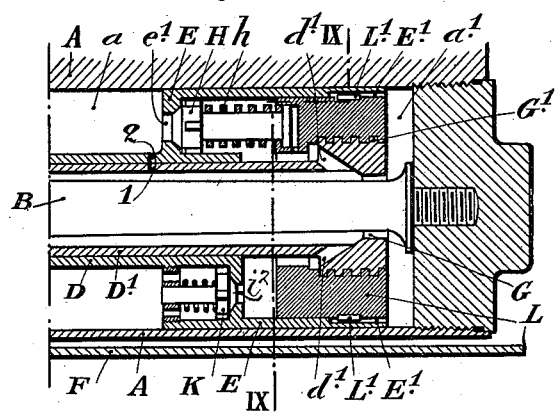
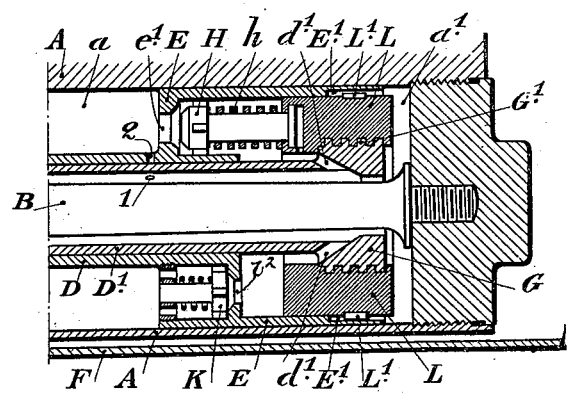

E. SCHNEIDER.
RECOIL BRAKE FOR GUNS.
APPLICATION FILED JUNE 16, 1919.

1,373,102.

Patented Mar. 29, 1921.
13 SHEETS—SHEET 6.

E. SCHNEIDER.
RECOIL BRAKE FOR GUNS.
APPLICATION FILED JUNE 16, 1919.

1,373,102.

Patented Mar. 29, 1921.
13 SHEETS—SHEET 7.

E. SCHNEIDER.
RECOIL BRAKE FOR GUNS.
APPLICATION FILED JUNE 16, 1919.

1,373,102.

Patented Mar. 29, 1921.
13 SHEETS—SHEET 8.

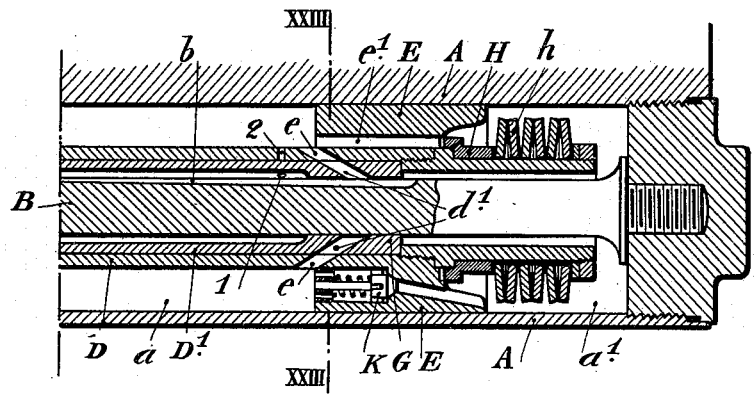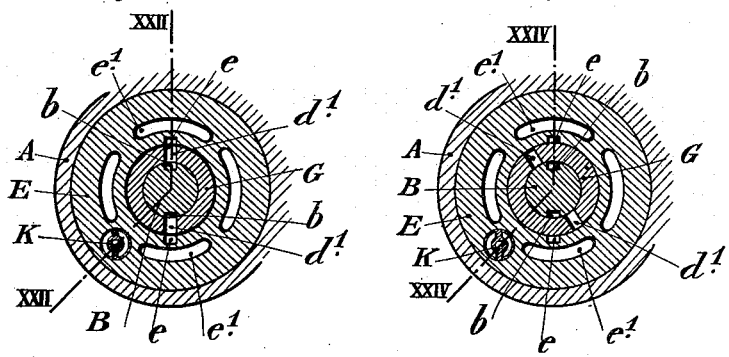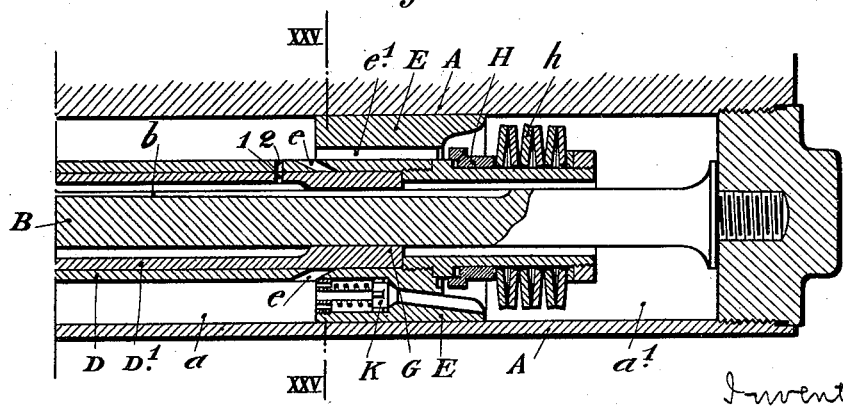

E. SCHNEIDER.
RECOIL BRAKE FOR GUNS.
APPLICATION FILED JUNE 16, 1919.
1,373,102.
Patented Mar. 29, 1921.
13 SHEETS—SHEET 10.
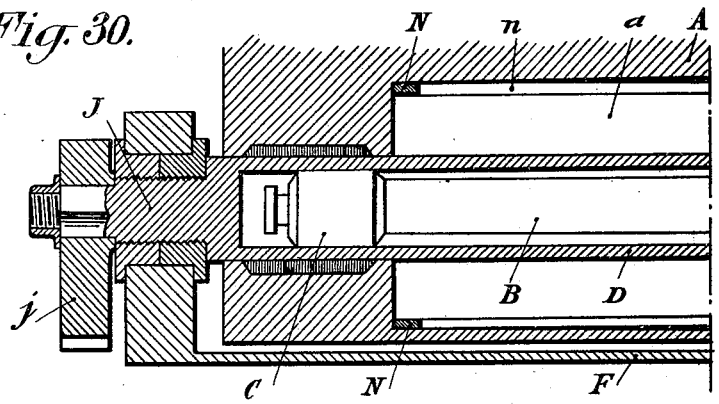
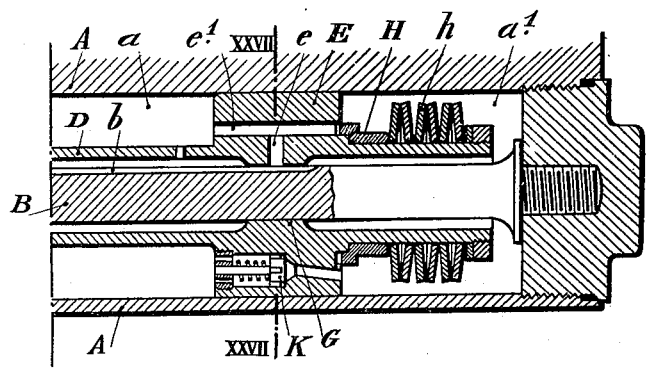
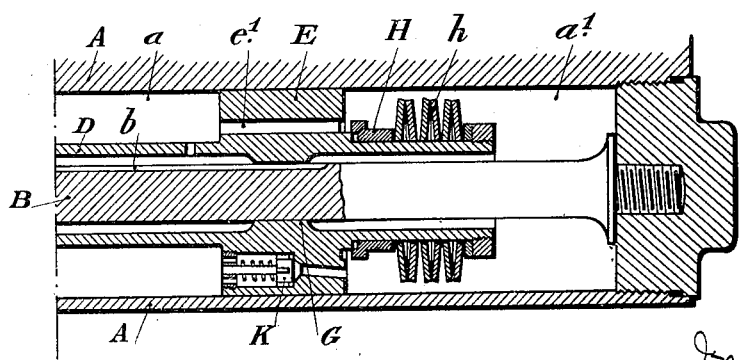

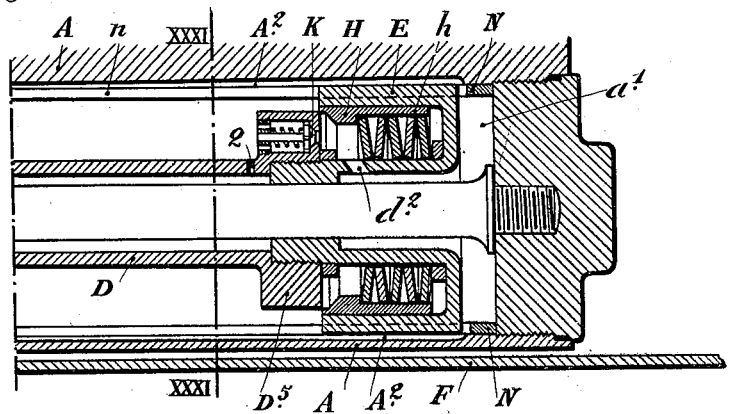
Fig. 30.ª
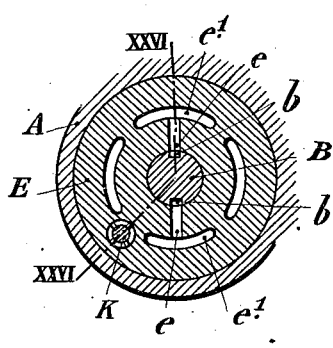
Fig. 27.
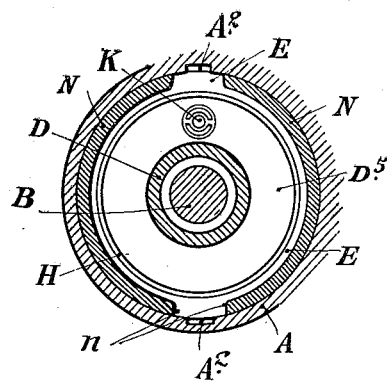
Fig. 31.
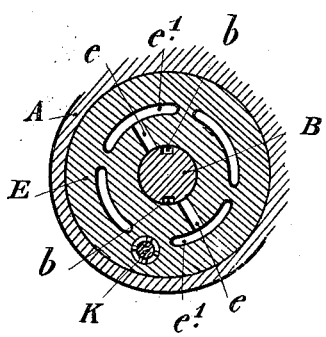
Fig. 29.
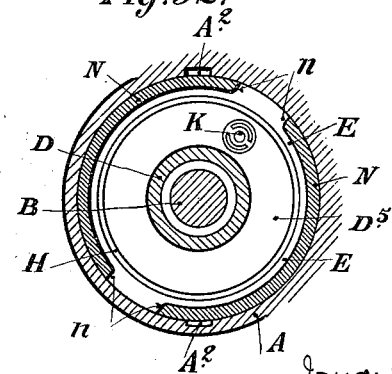
Fig. 32.

E. SCHNEIDER.
RECOIL BRAKE FOR GUNS.
APPLICATION FILED JUNE 16, 1919.

1,373,102.

Patented Mar. 29, 1921.
13 SHEETS—SHEET 12.

Inventor:—
Eugene Schneider
By Mauro, Cameron, Lewis & Massie
Attorneys.

E. SCHNEIDER.
RECOIL BRAKE FOR GUNS.
APPLICATION FILED JUNE 16, 1919.
1,373,102.
Patented Mar. 29, 1921.
13 SHEETS—SHEET 13.
Fig. 34.ᵃ
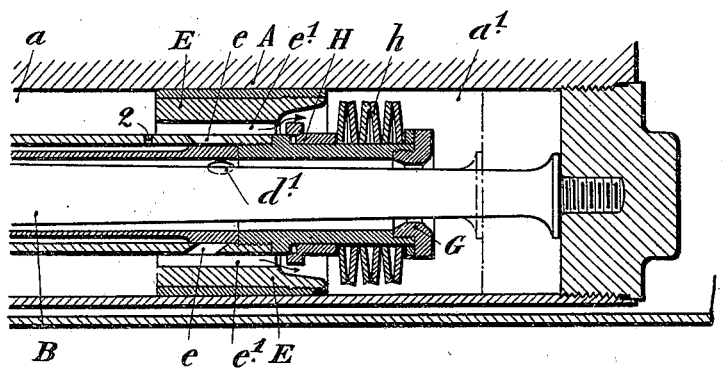
Fig. 35.ᵃ
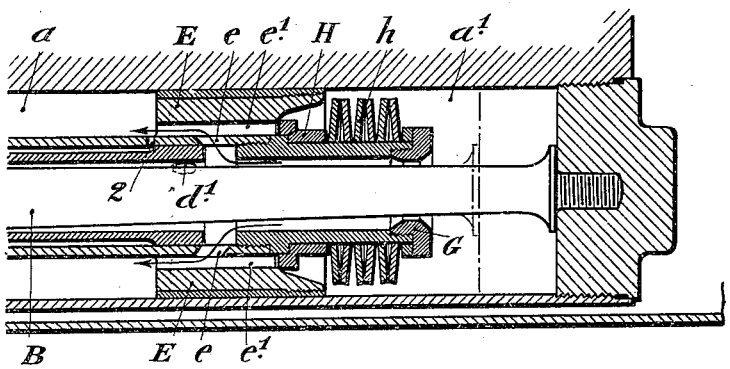
Inventor:-
Eugene Schneider
By
Mauro, Cameron, Lewis & Massie
Attorneys

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

RECOIL-BRAKE FOR GUNS.

1,373,102.   Specification of Letters Patent.   Patented Mar. 29, 1921.

Application filed June 16, 1919. Serial No. 304,655.

*To all whom it may concern:*

Be it known that I, EUGÈNE SCHNEIDER, a citizen of the Republic of France, residing at 42 Rue d'Anjou, Paris, France, have invented new and useful Improvements in Recoil-Brakes for Guns, which invention is fully set forth in the following specification.

This invention has for its object to provide an improved recoil brake for guns, combined with a moderator for running out the gun into firing position.

The brake is of the known type comprising a piston with a hollow piston rod fixed to the stationary part of the gun (for instance the gun cradle), and a brake cylinder fixed to the recoiling part (for instance the gun slide), provided at its end with a counter-rod movable in the cavity of the piston rod, and carrying the moderator valve.

The improved brake is characterized by the addition of a loaded valve which under a given pressure uncovers orifices of an auxiliary passage or passages through the piston for the flow of the liquid from one side to the other of the piston; the wire-drawing of the liquid during the said flow, producing a braking action to which is added or not added according to the circumstances of the case, the usual braking by wire-drawing of the liquid between the shaped counter-rod and the diaphragm formed on the piston, or through grooves in the counter-rod or in the cylinder, or again between grooves in the piston and shaped fillets on the cylinder.

The additional valve may be rendered operative or inoperative to a varying extent for the purpose of varying the length of the recoil. This total or partial rendering of the valve operative or inoperative may be effected by means of an obturating device which covers or uncovers wholly or partly, auxiliary passages for admitting the liquid to the said valve.

The same result may be effected by a mechanism which leaves the valve free to bear upon its seat, or which keeps it farther or less away from the latter.

It may also be effected by means of an obturating device which covers or uncovers at will the normal passages for the flow of the liquid through the piston or through the grooves in the counter-rod or the grooves in the cylinder.

Various constructional forms embodying the use of these various means for rendering the additional valve operative or inoperative, are illustrated by way of example in the accompanying drawings.

Figures 1 to 5 inclusive illustrate a first constructional form.

Complementary Figs. 1, 1ª are views showing an axial section of the brake cylinder showing the parts at rest, adjusted for the purpose of obtaining the greatest length of recoil.

Fig. 2 is a partial similar view showing the parts in an intermediate position during the recoil.

Fig. 5 is a partial longitudinal section of the brake showing the parts arranged for producing the minimum recoil.

Figs. 6 to 7 show a second constructional form of the device.

Figure 6:
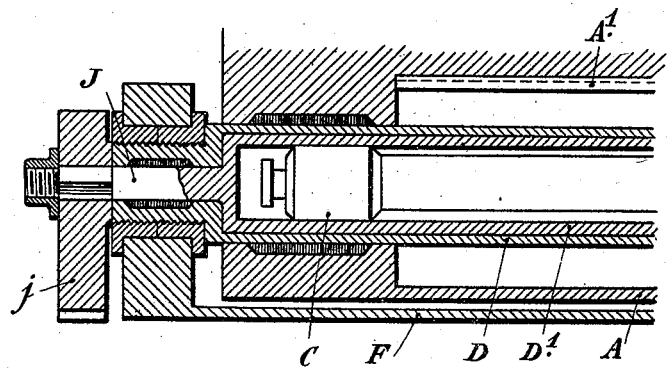
Figure 9:
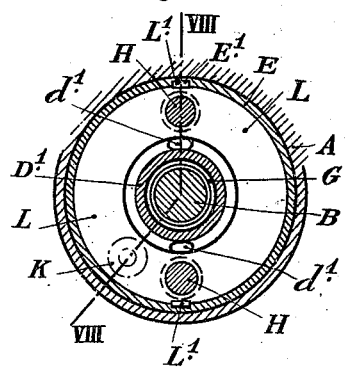
Figure 12:
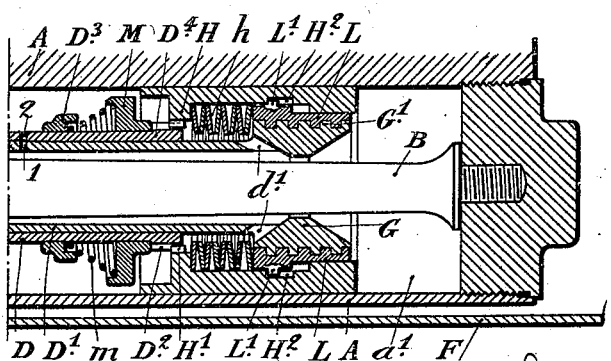
Figure 14:
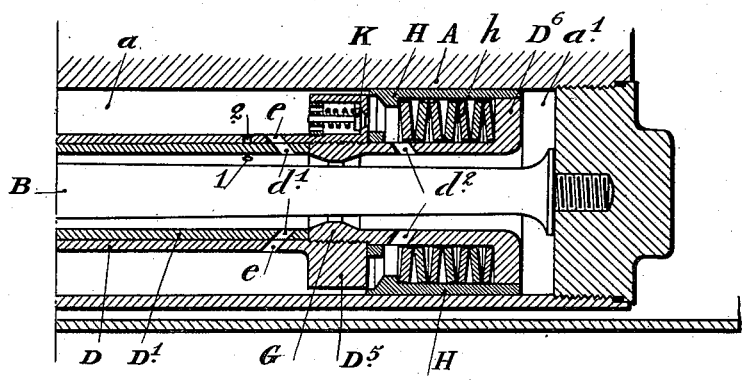
Figure 15:
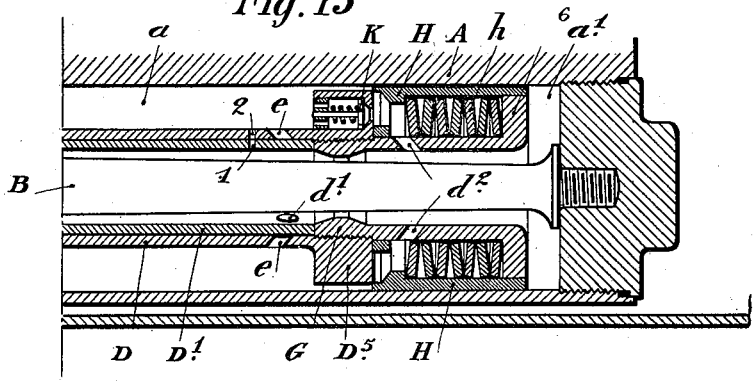
Figure 16:
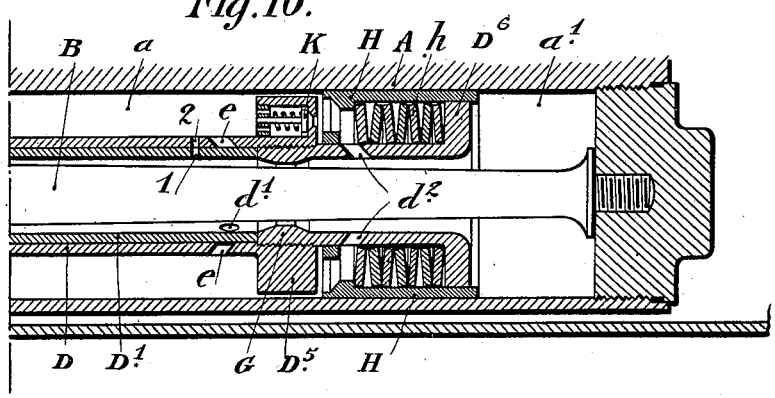
Figure 17:
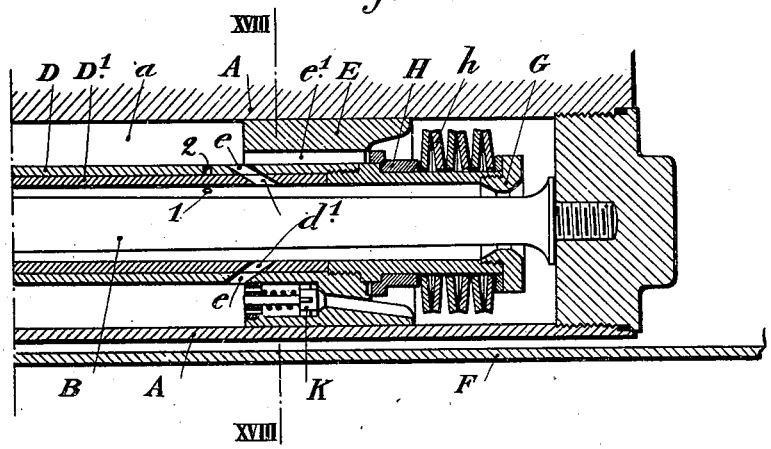
Figure 18:
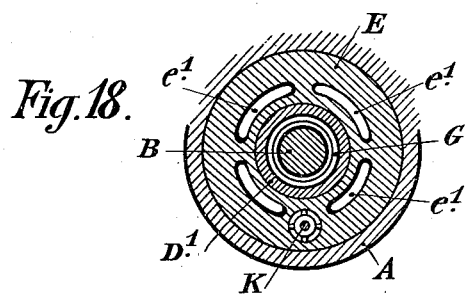
Figure 19:
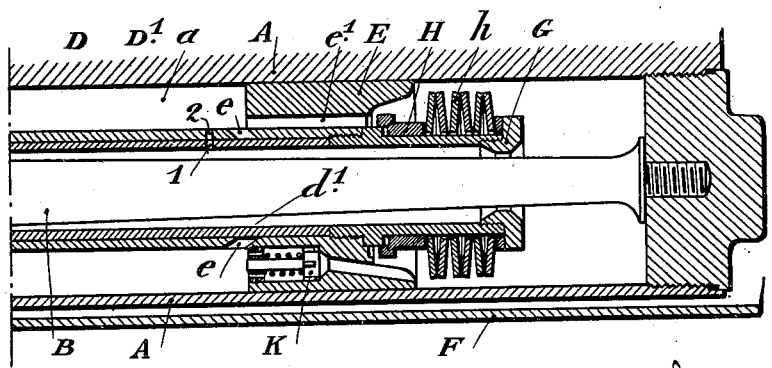
Figure 20:
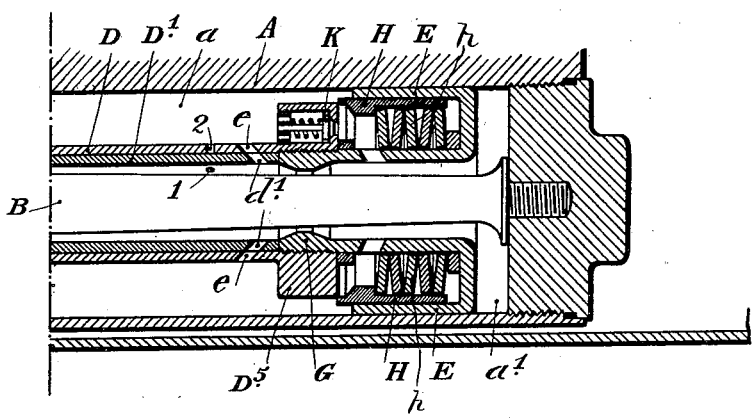
Figure 21:
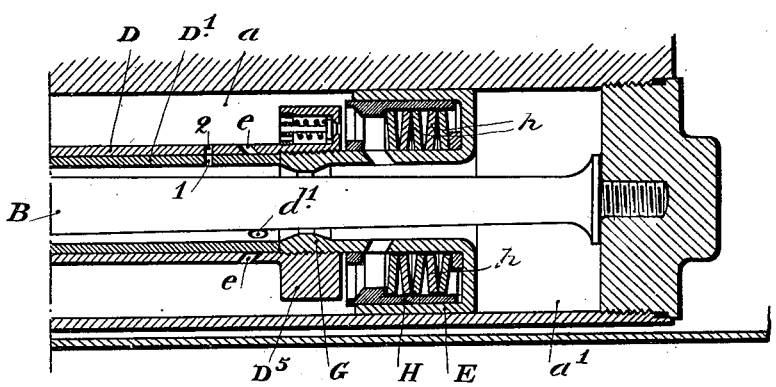
Figure 33:
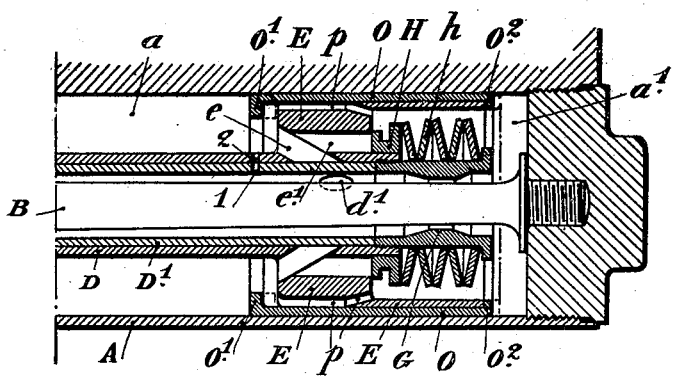
Figure 34:
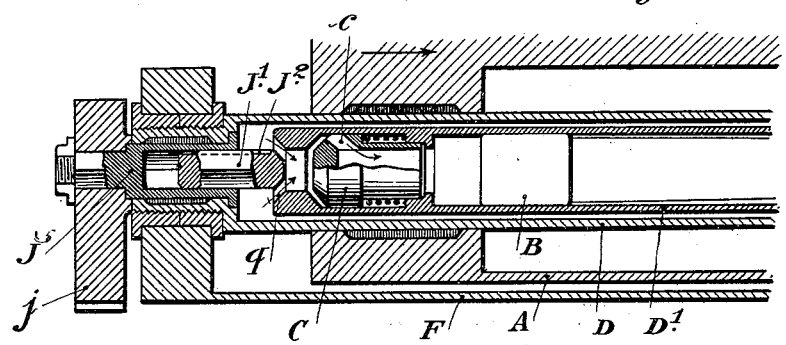
Figure 35:
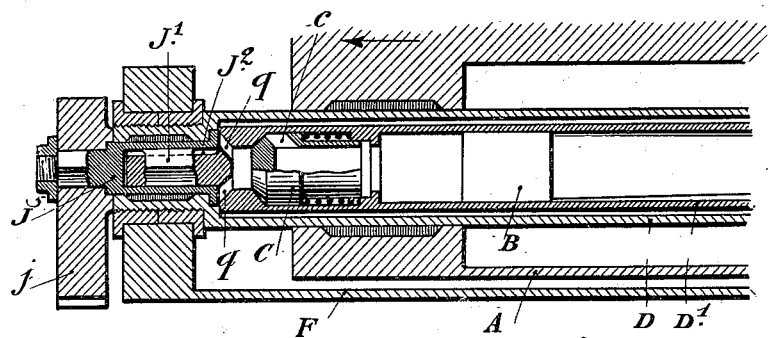

Complementary Figs. 6, 6ª are a partial longitudinal section on the line VI—VI of Fig. 7;

Fig. 7 is a cross-section on the line VII—VII of Fig. 6;

Fig. 8 is a partial longitudinal section on the line VIII—VIII of Fig. 9, showing only the rear portion of the brake. In this view the parts are shown as set for minimum recoil;

Fig. 9 is a cross-section on the line IX—IX of Fig. 8;

Fig. 10 is a view similar to that shown in Fig. 8 with the parts set for maximum recoil;

Figs. 11 to 13 illustrate a fourth constructional form of the device;

Fig. 11 is a longitudinal section of the rear part of the brake, the front portion being exactly the same as in the first example. In this figure, the parts are set for minimum recoil;

Fig. 12 is a similar view showing the parts in the relative positions they assume during minimum recoil;

Fig. 13 is a similar view showing the parts at rest and set for maximum recoil;

Figs. 14 to 16 illustrate a fifth constructional form of the device;

Fig. 14 is a longitudinal section of the rear portion of a brake embodying this form. In this view the parts are shown in the rest position, set for maximum recoil;

Fig. 15 is a similar view showing the parts set for minimum recoil;

Fig. 16 is a similar view showing the positions of the parts at the commencement of the minimum recoil;

Fig. 17 is a partial longitudinal sectional view of a sixth constructional form of the device and a modification of the previous form. In this view the parts are shown in the rest position, set for maximum recoil;

Fig. 18 is a cross-section on the line XVIII—XVIII of Fig. 17;

Fig. 19 is a longitudinal section similar to Fig. 17, showing the parts at the commencement of the minimum recoil;

Fig. 20 is a partial longitudinal section of a seventh constructional form, and a second modification of the device shown in Figs. 14–16. The parts are shown in rest position, set for maximum recoil;

Fig. 21 is a similar view, showing the parts at the commencement of the minimum recoil;

Figs. 22 to 25 show a seventh constructional form of the device;

Fig. 22 is a partial longitudinal sectional view of the device, on the lines XXII—XXII of Fig. 23, showing the parts in rest position, set for maximum recoil;

Fig. 23 is a cross-section on the line XXIII—XXIII of Fig. 22;

Fig. 24 is a partial longitudinal sectional view on the lines XXIV—XXIV of Fig. 25, the parts being shown at the commencement of minimum recoil;

Fig. 25 is a cross-section on the lines XXV—XXV of Fig. 24;

Figs. 26 to 29 show an eighth constructional form of the device and a modification of the preceding example;

Fig. 26 is a longitudinal sectional view of the rear portion of the brake on the lines XXVI—XXVI of Fig. 27, showing the parts in rest position, set for maximum recoil;

Fig. 27 is a cross section on the line XXVII—XXVII of Fig. 26;

Figs. 28 and 29 are sectional views corresponding, respectively, to those shown in Figs. 26 and 27, the parts being shown set for the minimum recoil and at the beginning of such recoil;

Figs. 30 to 32 illustrate a ninth constructional form of the device;

Complementary Figs. 30, 30$^a$ are a longitudinal section, showing the parts in rest position, set for minimum recoil;

Fig. 31 is a cross-section on the line XXXI—XXXI of Fig. 30$^a$, showing the parts in rest position and set for maximum recoil;

Fig. 32 is a similar view, showing the parts set for minimum recoil;

Fig. 33 is a partial longitudinal section of a ninth constructional form, the same being a modification of the example shown in Figs. 17 to 19;

Figs. 34 to 35 show a tenth constructional form, the same being another modification of the example shown in Figs. 17 to 19;

Complementary Figs. 34, 34$^a$ are a longitudinal section of the device, showing the parts set for minimum recoil and in the position they occupy at the commencement of such recoil;

Complementary Figs. 35, 35$^a$ are a similar view, showing the parts in the positions they assume at the very beginning of the running-out movement of the gun.

In the constructional forms shown in Figs. 1 to 5, the brake comprises in the known manner a cylinder A attached to the recoiling part, and having fixed to its end a shaped counter-rod B provided at its free end with the usual valve C of the moderator for runing out the gun into firing position.

The combination B—C is engaged in the cavity of the brake piston rod D. E is the piston.

The piston and piston rod D—E are carried by a fixed part of the gun, for instance the gun cradle F.

The piston rod comprises a stationary part D in which is engaged a liner $D^1$. The cavity of this liner $D^1$ constitutes the chamber in which the counter-rod B is engaged.

The usual diaphragm G is in this case formed on an extension of the liner $D^1$. A shoulder $g$ on this liner serves as an abutment for a pile of Belleville washers $h$ which have normally a tendency to keep the additional valve H bearing against its seat.

This valve consists of a ring slipped on the liner $D^1$. The seat of the valve is formed on a spider I formed in one piece with or attached to the liner $D^1$.

The piston E is pierced on one hand with a series of passages $e$ for the normal flow of the liquid through the piston and piston rod D—$D^1$, and on the other hand with auxiliary passages $e^1$ for admitting the liquid to the additional loaded valve.

The liner $D^1$ is pierced with passages $d^1$ that establish in a continuous manner a communication between the chamber $a$ of the brake cylinder and the rear portion of the cavity of the liner $D^1$, by way of the passages $e$.

The spider I is formed with orifices $i$. These orifices may be brought at will into the position shown in full lines in Fig. 3 and visible in Fig. 1$^a$ where they uncover completely the passages $e^1$ for admitting the liquid to the valve H, or they may be brought into the position indicated by dot and dash lines $i^1$ (Fig. 3) where they are situated opposite a solid part of the piston, the admission of the liquid to the valve being then completely shut off.

On moving the spider I into an intermediate position, the passages $e^1$ will be partially uncovered.

The movement of the spider I is produced by rotating the liner $D^1$ which is provided for this purpose with a journal J carried in a bearing formed on the gun cradle F. On this journal is keyed an actuating member such as a toothed sector $j$ which is adapted to be actuated by the elevating movements of the gun barrel.

Figure 1:
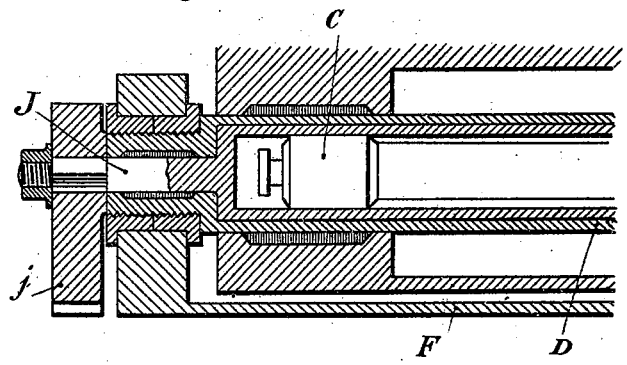

Figs. 1, 1ª, 3 and 4 show the parts in the position in which the brake is set for the maximum recoil, the orifices $i$ of the spider uncovering completely the passages $e^1$ for admitting the liquid to the valve H.

The force of the spring $h$ loading the valve H is so adjusted that the said valve will open as soon as the pressure in the chamber $a$ increases, that is to say, at the very beginning of the recoil. The parts are then in the position shown in Fig. 2.

The flow of the liquid from one side to the other of the piston takes place through the passages $e$ and $d^1$, and it is further facilitated by the flow through the passages $e^1$ and $i$.

Figure 3:
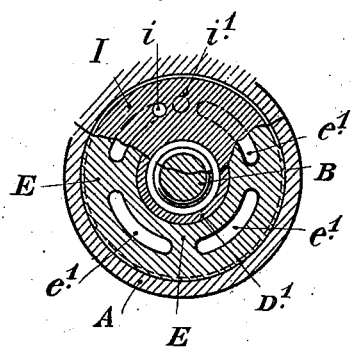
Fig. 3 is a cross section on the line III—III of Fig. 1.

If, by rotating the liner $D^1$, the orifices $i$ of the spider are brought into the position indicated in dot and dash lines $i^1$ Fig. 3, the pressure liquid can no longer reach the valve H, and the flow takes place only through the passages $e$ and $d^1$, Fig. 5, and in these circumstances the recoil is reduced to its minimum.

If the spider I be moved into an intermediate position wherein the orifices $i$ partly uncover the passages $e^1$, the valve H will lift and the flow of the liquid will take place through the more or less throttled section of the orifices $e^1$ uncovered by the spider I. The result on the whole will be an intermediate braking between the minimum braking and the maximum braking.

The Figs. 1, 1ª, 2, 4 and 5 show a safety device intended to accelerate the return to battery, which permits the passage of the liquid from the chamber $a^1$ to the chamber $a$.

Figure 4:
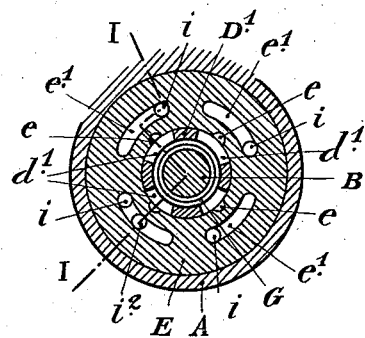
Fig. 4 is a cross section on the line IV—IV of Fig. 1.

For this purpose there is arranged in the valve H a non-return valve K which on being opened by the pressure of the liquid in the chamber $a^1$, will allow the liquid to flow through an orifice $i^2$ of the spider I, said orifice being always situated opposite one of the passages $e^1$ in the piston E, Fig. 4.

In the constructional form shown in Figs. 6 to 7, the additional loaded valve H—$h$ is constructed as in the preceding example; it bears on one side upon the Belleville washers $h$ and on the other side upon the spider I formed on the liner $D^1$.

The characteristic feature of this modification consists in this that the braking for the minimum recoil takes place solely between grooves $e^2$ formed in the piston and fillets $A^1$ projecting from the wall of the brake cylinder A, which have a section increasing from the rear toward the front; the admission of the liquid to the valve being then closed by a suitable displacement of the orifices $i$.

When these orifices uncover partly or wholly the passages $e^1$, the flow of the liquid takes place at once through the more or less throttled orifices $i$ and between the grooves $e^2$ and the fillets $A^1$. The figures show the parts set for the maximum recoil.

In this modification the rod B is wholly cylindrical. In order that the rear chamber of the liner $D^1$, that is to say, the space comprised between the end of this liner and the moderator valves C, shall be able from the very beginning of the recoil to receive the quantity of liquid necessary to fill it, there is provided in the liner an orifice 1 which comes opposite a corresponding orifice 2 formed in the piston rod D when the parts are set for the small recoil.

In the constructional forms hereinbefore described the additional valve is rendered operative or inoperative by means of an obturating device that covers or uncovers partially or wholly passages admitting the liquid to the valve.

In the two examples illustrated by Figs. 8 to 13 and which will now be described, the additional loaded valve may be rendered operative or inoperative by means of a device that leaves it free to bear upon its seat, or that keeps it more or less away from the latter.

In the example shown in Figs. 8 to 10 two additional valves H are guided in a ring L which is capable of moving longitudinally in the piston E. The ring L is for this purpose formed with a rib $L^1$ movable in a corresponding groove $E^1$ in the piston. A seat is provided for each of the valves H in the piston E opposite an orifice $e^1$ for admitting liquid coming from the cylinder chamber $a$.

The valves H are capable of a limited movement in the guide ring L. Normally, the spring $h$ whose tension constitutes the load of the valve, presses the latter upon its seat.

The ring L serves as a nut for a screw-thread $G^1$ formed on the free end of the liner $D^1$. It will be perceived that on rotating the said liner in the desired direction, the ring L will be caused to make a longitudinal movement in the piston E, which movement will have the result of moving the valves H more or less away from their seats.

When the parts are arranged as shown in Fig. 8, the flow of the liquid during the recoil can take place directly only through the orifices $e^1$ and the valve H. In other words, the liquid in order, to pass from one side of the piston to the other, lifts the valves H, is wire-drawn between the said valves and their seats, and flows without resistance through the orifices $d^1$ of the liner $D^1$. This regulation corresponds to the minimum recoil.

If, by reason of a change of elevation of the gun barrel, the liner $D^1$ in rotating, moves the ring L to the rear, the latter will gradually move the valve H away from their seats. The result is that the resistance offered to the flow of the liquid by the additional valve will become less at the commencement of the recoil and will begin to make itself felt only at a moment when the shaped counter-rod B is presenting a greater section opposite the diaphragm G. In other words, the braking is then due wholly to the wire-drawing of the liquid through the additional valves and to the wire-drawing of the liquid between the diaphragm G and the counter-rod B.

If the angular displacement given to the liner $D^1$ has remained such that the ring L has moved the valves H sufficiently from their seats (Fig. 10), the liquid will, at the very beginning, be able to flow freely through the orifices $e^1$. The liquid will however encounter a resistance to its flow between the diaphragm G and the counter-rod B immediately the latter shall have presented a sufficiently large section opposite to the said diaphragm. The parts have thus been set for the maximum recoil.

As in the example shown in Figs. 6 and 7, there is provided in the liner $D^1$ an orifice 1 which comes opposite a corresponding orifice 2 formed in the piston rod D when the parts are set for the small recoil (Fig. 8).

A valve K provided in the piston E has in this example exactly the same function as the valves referred to by the same reference letter in the preceding examples. But in this case, the valve K' is necessary because, when the parts are set for minimum recoil, the flow of the liquid from the chamber $a'$ to the chamber $a$ cannot take place, when the gun is run out, through the orifices $e'$, which are then completely closed by the valve H. Consequently, the liquid must flow through the orifice $i^2$ then uncovered by the lifting of the valve K.

In the example shown in Figs. 11 to 13, and which is a modification of the preceding example, the additional loaded valve consists of a sleeve H movable with slight friction in the brake cyinder A, and guided by means of grooves and ribs along the piston rod D. The grooves $D^2$ are formed in the rod D, and the ribs $H^1$ are formed in the valve sleeve H.

The ring L that serves as a nut, is screwed on the end G of the liner $D^1$ which is provided for this purpose with a screw-thread $G^1$. A spring $h$ bears on one hand against a shoulder on the sleeve H, and on the other hand against the front end of the nut L.

The nut L is further guided by means of a rib $L^1$ in a groove $H^2$ in the ring of the valve sleeve H.

A seat for the sleeve H is constituted by the ring M which a spring $m$ (bearing against a collar $D^3$ of the liner $D^1$) has a constant tendency to press against a shoulder $D^4$ of the said liner.

When the parts are set as shown in Fig. 11, the flow of the liquid during the recoil can take place only after the lifting of the valve H, which valve constitutes a movable part of the piston. The liquid can pass from one side of the piston to the other through the orifices $d^1$ only after having been wire-drawn between the sleeve H and the ring M, the sleeve H having been pressed back by the fluid-pressure in the chamber $a$ against the action of the spring $h$ as shown in Fig. 12.

The movement of the sleeve H on the ring L by the pressure of the liquid coming from the chamber $a$, has the result of compressing the spring $h$. At the end of the recoil the valve H is returned on to its seat by the expansion of the said spring.

On the gun being run out into firing position the liquid coming from the rear chamber $a^1$ of the cylinder A, will have filled the chamber $a$ by flowing through the orifices $d^1$ and between the sleeve H and the ring M which latter is pushed toward the collar $D^3$.

If for the purpose of increasing the length of the recoil, the liner $D^1$ be rotated, the nut L will be moved longitudinally and in this movement will carry with it the valve H, thereby moving the latter more or less away from its seat M.

When the parts are set for the maximum recoil, the distance between the valve H and its seat M is such that in the recoil the braking can be effected only by the wire-drawing of the liquid between the diaphragm G and the shaped counter-rod B.

In the following examples the rendering of the additional loaded valve partially or totally inoperative is effected by means of an obturated device that uncovers partly or wholly the normal passages for the flow of the liquid.

Referring to Figs. 14 to 16, the additional valve consists of a sleeve H movable with slight friction in contact with the walls of the brake cylinder A. The spring $h$ that constitutes the load of this valve, bears at one end against a collar $D^6$ formed on the rear end of the liner $D^1$, and at its other end against a shoulder of the valve sleeve. The seat of the valve is constituted by a flange-like extension $D^5$ of the piston rod D.

In this flange-like extension there is formed a chamber wherein the valve K is mounted.

The normal passages $e$ for the flow of the liquid may be partly or wholly covered by a liner $D^1$ provided with corresponding orifices $d^1$.

When, by reason of the slight inclination given to the gun barrel, the liner $D^1$ occupies the position shown in Fig. 14 wherein the orifices $d^1$ uncover completely the orifices $e$, the liquid is able to pass from the front face to the rear face of the piston, finding a large flow-section in the passages $e-d^1$, and the recoil takes place without the valve H moving away from its seat.

If the orifices $e$ are closed more or less completely by a movement of the liner $D^1$, the slackening of the flow through the passages $e-d^1$ will allow the pressure in the chamber $a$ to rise sufficiently to cause the valve H to lift. When the orifices $e$ are completely closed, the flow of the liquid takes place only between the valve H and its seat $D^5$ (Figs. 15 and 16); the liquid which is wire-drawn between the valve H and its seat flows toward the chamber $a^1$ through the orifices $d^2$.

In the modification shown in Figs. 17 to 19 the additional valve consists of a ring H for which a seat is provided in a recess in the piston E.

When the normal passages $e$ for the flow of the liquid through the piston rod are wholly uncovered, the braking action will take place solely by the wire-drawing of the liquid between the diaphragm G and the shaped counter-rod B.

When, on the contrary, the passages $e$ are completely closed owing to a suitable rotation of the liner $D^1$, the braking action will take place solely by the wire-drawing of the liquid between the valve H and its seat (Fig. 19).

In the example shown in Figs. 20 to 21, the additional loaded valve consists of a ring H movable in a recess in the piston E. The spring $h$ bears at one end against the bottom of this recess, and at its other end against a shoulder on the ring H. The seat for the valve is formed by a flange-like extension $D^5$ of the piston as in the example shown in Figs. 14 to 16. The operation is exactly the same as in the preceding example.

The obturating device that renders the additional valve operative or inoperative, instead of shutting off the passages for the flow of the liquid through the piston rod, may shut off the flow through grooves of counter-rod. This modification is illustrated in Figs. 22 to 25.

The additional valve in this modification is constructed exactly in the same manner as in the example shown in Figs. 17 to 19. In the present case the counter-rod B is cylindrical but is cut with grooves $b$ whose depth diminish from the rear toward the front.

When the parts are set as shown in Figs. 22 and 23, the liner $D^1$ uncovers completely the normal orifices $e$ for the flow of the liquid between the diaphragm G and the grooves $b$.

When the liner $D^1$ has been moved angularly so as to close the communication between the orifices $e$ and the grooves $b$, the flow can take place only through the passages $e^1$ of the piston between the valve H and its seat.

Figs. 26 to 29 illustrate a modification of the preceding example.

In this modification the throttling diaphragm G is formed in the piston E, and the passages $e$ for the admission of the liquid to the shaped grooves $b$ of the counter-rod B, are constituted by branches of the passages $e^1$ that serve to admit the liquid to the valve H.

The interruption of the communication between the grooves $b$ and the passages $e$ is effected by an angular movement of the piston D—E.

In the constructional form shown in Figs. 30-32 the piston D—E is movable around its longitudinal axis for the purpose of varying the length of the recoil. It is guided in a slide valve sleeve N whose ports $n$ extend almost the entire length of the cylinder A. Grooves $A^2$ decreasing in depth from the rear toward the front are cut in the wall of the cylinder A.

According to the position given to the sleeve N, the communication of the grooves $A^2$ with the chamber $a$ of the brake cylinder can be wholly or partly established or shut off at will. The additional valve H—$h$ is constructed exactly as in the example illustrated in Figs. 20 and 21.

When the grooves $A^2$ are completely uncovered (Figs. 30 and 31, the braking action is effected solely by the throttling of the flow of the liquid through the grooves $A^2$ and around the outside of the piston.

When the grooves $A^2$ are completely covered (Fig. 32), the braking action is effected solely by the wire-drawing of the liquid between the lifted valve H and its seat $D^5$.

All the hereinbefore described examples have as their common essential characteristic feature, the combination of the ordinary braking means with an additional loaded valve which can be rendered partially or wholly operative either by the intervention of an obturating device that covers the normal orifices for the flow of the liquid or the orifices for admitting the liquid to the valve, or is effected by a device that moves the valve off its seat.

Compared with the devices hitherto known for varying the length of the recoil, this combination has an important advantage, namely, the points or peaks of pressure or sudden rises of pressure in the brake cannot take place in any case even when the normal passages for the flow of the liquid are wholly closed, because the pressure can never exceed the pressure that corresponds to the lifting of the additional valve. In other words, for obtaining the minimum recoil, as well as for the recoils of intermediate length between the minimum recoil and the maximum recoil, all dangerous excess of pressure is entirely obviated.

In all the constructional forms hereinbefore described, the flow of the liquid from the rear chamber $a^1$ of the brake cylinder toward the chamber $a$ for running the gun out into firing position, is, as has been seen, rendered possible by the provision of a non-return valve K in the ring H, or in the piston, or by means of a movable seat acting as a valve provided around the liner $D^1$ (Figs. 12, 11, and 13).

The provision of these parts, while well adapted to guns of large caliber, may present difficulties when applied to guns of small caliber, for in the latter instance the piston and the additional valve H must necessarily be made of small dimensions, too small to accommodate the non-return valve K in the form previously described. To avoid this difficulty, a modified non-return valve, having the same function as the previous one, is provided to meet the requirements of the reduced dimensions of the piston and the additional valve. Such a modified non-return valve is shown in Fig. 33, which also shows a modification of the constructional form of the device illustrated in Figs. 17–19.

Referring to Fig. 33, a sleeve O is interposed between the piston E and the brake cylinder with a rather tight fit therebetween to prevent leakage of the fluid past the piston. This sleeve is slightly longer than the piston and at its ends has inwardly turned flanges O′ and O² to engage the ends of the piston to limit the sleeve to a slight longitudinal play on the piston. The piston is provided with orifices $p$ to provide a passage for the fluid from the chamber $a'$ to the chamber $a$ of the brake cylinder during the running out movement of the gun. The flange O′ is sufficiently wide to close these orifices when pressed against the adjacent ends of the piston.

As shown in Fig. 33, the parts are set for minimum recoil. In the running out movement of the gun, the sleeve O is moved forward on the piston to the position shown in the figure so that the flange O′ uncovers the orifices $p$ to permit the passage therethrough of the fluid from the chamber $a^1$ to the chamber $a$. The sleeve is so moved by the fluid in the chamber $a^1$ pressing on its rear end and flange O², and also by the frictional engagement of the brake-cylinder with the sleeve as the cylinder moves forward in the running out movement.

At the very beginning of the recoil, the fluid in the chamber $a$ presses on the sleeve O to move the latter rearward on the piston, as indicated by dot and dash lines in the figure, to close the flange O′ on the orifices $p$ to prevent passage therethrough of the fluid-pressure during recoil. This rearward or closing movement of the sleeve is augmented by its frictional engagement with the brake-cylinder as the latter moves to the rear during recoil. In this way a non-return valve is provided that has all the functions of the non-return valve K previously described, and one that is adapted to the lesser dimensions of small caliber guns.

Figs. 34 and 35 illustrate another modification of the constructional form illustrated in Figs. 17, 18 and 19, wherein the function of the valve K is performed by the moderator valve C which is mounted for this purpose in the liner $D^1$, the latter being constructed in a peculiar manner so as to allow it to receive a longitudinal movement from the action of the pressure liquid.

In this form, the liner $D^1$, instead of being fixed to the axle J, is mounted in a hollow end of the axle by means of a tenon $J^1$ of square section formed with a groove $J^2$. The said liner $D^1$ can receive a slight longitudinal displacement along the counter-rod B. A lodgment is provided at the forward end of the liner for a hollow valve C pierced with orifices $c$. The end of the liner is likewise pierced with passages $q$.

In the running out movement of the gun the liquid which is forced back by the counter-rod B, will push in the forward direction as a whole the valve C bearing upon its seat, and the liner $D^1$. The latter will then uncover at its rear end the orifices $e$. Consequently the liquid will be able to flow from $a^1$ to $a$ through the uncovered orifices as shown in Fig. 35ª.

At the very beginning of the recoil the pressure of the liquid acting upon the forward end of the liner $D^1$, will push the latter in the rearward direction so as to return it into the position shown in Fig. 34. Besides the valve C opens and thus allows the liquid to fill the interior of the liner.

What I claim is:—

1. In a recoil brake for guns, the combination of a brake cylinder movable with a recoiling part of the gun and provided with a counter rod, a brake piston having a tubular piston rod for receiving the counter rod to throttle the flow of fluid through the tubular piston rod, means providing a normal passage for the braking fluid from one side of the piston to the other with means for throttling such normal passage during recoil, said piston having an auxiliary passage forming an additional communication between its opposite sides for the braking fluid, a loaded valve normally closing said auxiliary passage and operative by fluid-pressure to open the auxiliary passage only during recoil, and means operable outside of the brake cylinder for rendering said valve more or less operative in throttling the auxiliary passage independently of the normal throttling means to determine the length of recoil.

2. In a recoil brake for guns, the combination of a brake cylinder movable with a recoiling part of the gun and provided with a counter rod, a brake piston having a tubular piston rod for receiving the counter rod to throttle the flow of liquid through the tubular piston rod, means providing a normal passage for the braking fluid from one side of the piston to the other with means for throttling such normal passage during recoil, said piston having an auxiliary passage forming an additional communication between its opposite sides for the braking fluid, a loaded valve normally closing the auxiliary passage and operative by fluid-pressure to open the auxiliary passage only during recoil, a liner rotatable within the tubular piston by means operable outside of the cylinder, and means operated by the turning of the liner for rendering the valve more or less operative in throttling the auxiliary passage independently of the normal throttling means to determine the length of recoil.

3. In a recoil brake for guns, the combination of a brake cylinder movable with a recoiling part of the gun and provided with a valved counter rod, concentric cylinder members in said brake cylinder one of which is fast to a stationary part of the gun mount and the other adapted to receive said counter rod and to rotate in respect to its companion member, a valve seat carried by one of said members, a piston on the other member having a spring pressed valve ring adapted to be moved off said seat by rotating said last named member and other means for throttling the flow of fluid from one side of said piston to the other.

4. In a recoil brake for guns, the combination of a brake cylinder movable with a recoiling part of the gun, and provided with a valved counter rod, concentric cylinder members in said brake cylinder one of which is fast to a stationary part of the gun mount and the other of which is adapted to receive said counter rod and to rotate in respect to its companion member, a valve seat mounted on one member and a spring pressed valve member on the companion member, a non-revoluble nut having threaded engagement with said revoluble cylinder member for moving said valve to vary the length of recoil.

5. In a recoil brake for guns, the combination of a brake cylinder movable with a recoiling part of the gun and provided with a valved counter rod, concentric cylinder members located in said brake cylinder one of which is fast to a fixed part of the gun mount and the other of which is adapted to rotate relatively to its companion member and is provided with a diaphragm through which said counter rod throttles the brake fluid passing from one side of the piston to the other, a valve seat mounted on the outer cylinder member and a spring pressed valve adapted to coöperate with said seat, and means operated by rotating said inner cylinder for varying spring pressure on said valve comprising a nut abutment for said spring having threaded engagement with said revoluble cylinder and adapted to be guided by a part of the piston.

6. In a recoil brake for guns, the combination of a brake cylinder movable with a recoiling part of the gun and provided with a valved counter rod, a brake piston in said cylinder, concentric cylinder members located in said brake cylinder one of which is fast to a fixed part of the gun mount and the other of which is adapted to rotate relatively to its companion member and is provided with a diaphragm through which said counter rod throttles the brake fluid passing from one side of the piston to the other, a spring pressed valve seat mounted on the stationary cylinder member and a spring pressed piston ring fitting the brake cylinder and having a valve portion for coöperating with said seat and means operated by the said inner cylinder member for varying the pressure on said valve comprising a nut abutment for said spring having threaded engagement with said inner cylinder and adapted to be guided by said piston ring.

7. In a recoil brake for guns, the combination of a brake cylinder and piston respectively connected with the fixed and recoiling parts of a gun, means providing a normally throttled passage for the braking fluid from one side of the piston to the other, said piston having an auxiliary passage forming an additional communication between its opposite sides for the braking fluid, a loaded valve normally closing the auxiliary passage and operative by the fluid-pressure to open the auxiliary passage only during recoil, and means operable outside of the cylinder for rendering the loaded valve more or less operative in throttling the auxiliary passage independently of the normal throttling means to determine the length of recoil.

8. In a recoil brake for guns, the combination of a brake cylinder movable with a recoiling part of the gun and provided with a counter rod, a brake piston having a tubular piston rod for receiving said counter rod and connected to a stationary part of the gun, means for normally throttling the braking fluid flowing from one side of the piston to the other, said piston having an additional passage forming a direct communication between its opposite sides for the braking fluid, a loaded valve normally closing said additional passage and operative by fluid-pressure to open said passage only during recoil, means controlled outside of the brake cylinder for rendering said valve operative or inoperative, independently of the normal throttling means, to determine the length of recoil, said piston also having a second additional passage between its opposite sides for the braking fluid, said second additional passage being controlled by a one-way valve operating to open its passage for the fluid-pressure from the rear to the front side of the piston during counter-recoil.

In testimony whereof I have signed this specification.

EUGÈNE SCHNEIDER.

Witnesses:
ANDRÉ MOSTICKER,
CHAS. P. PRESSLY.